March 12, 1929.     H. E. KINCHELOE     1,705,190
COMBINED MAP CASE AND DISPLAY RACK
Original Filed Nov. 28, 1927     2 Sheets-Sheet 1
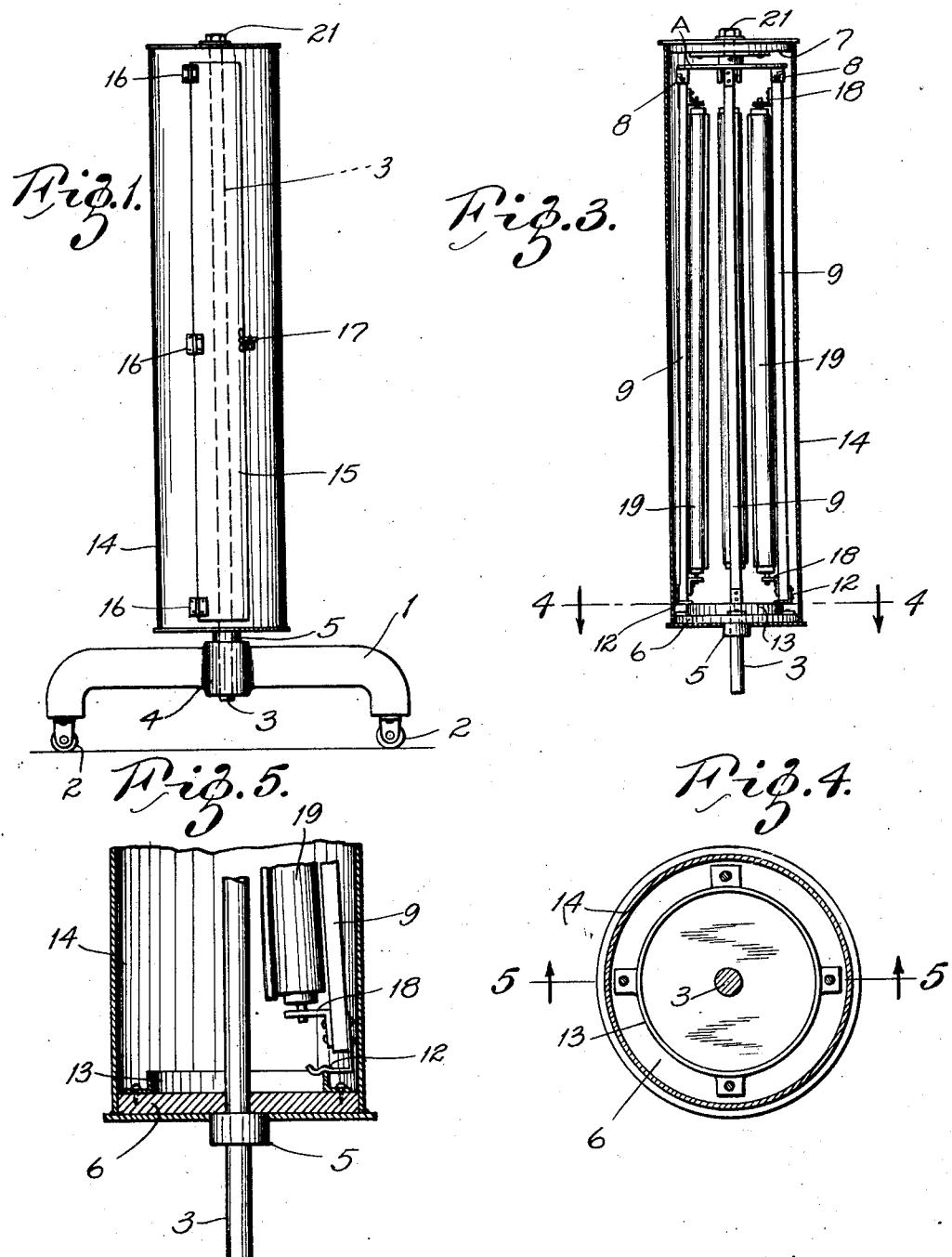
INVENTOR:
HERBERT E. KINCHELOE
By W. L. Dempsey,
ATTORNEY.

March 12, 1929. H. E. KINCHELOE 1,705,190
COMBINED MAP CASE AND DISPLAY RACK
Original Filed Nov. 28, 1927 2 Sheets-Sheet 2
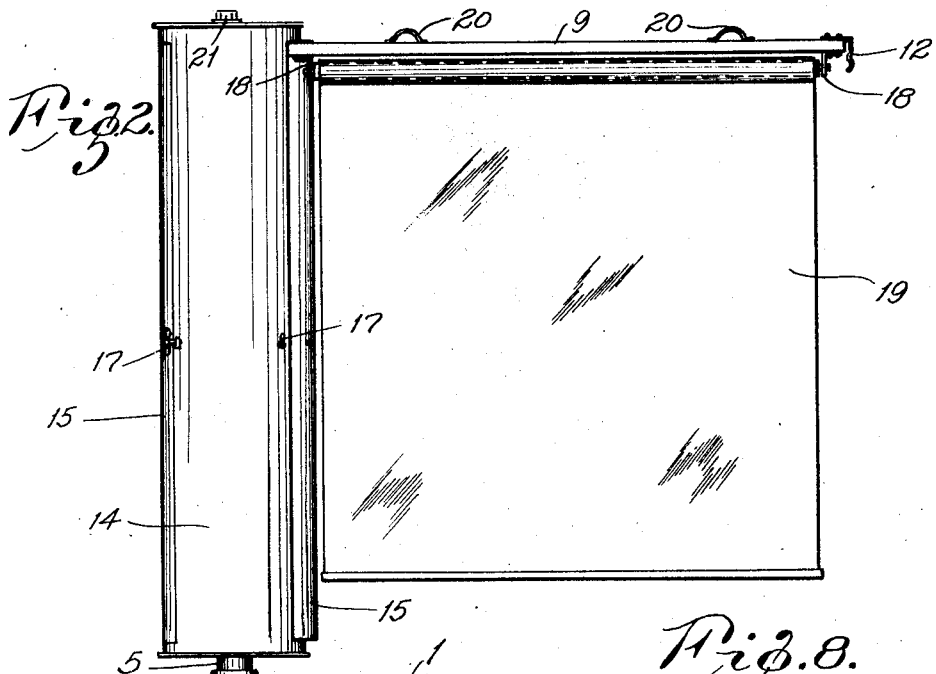
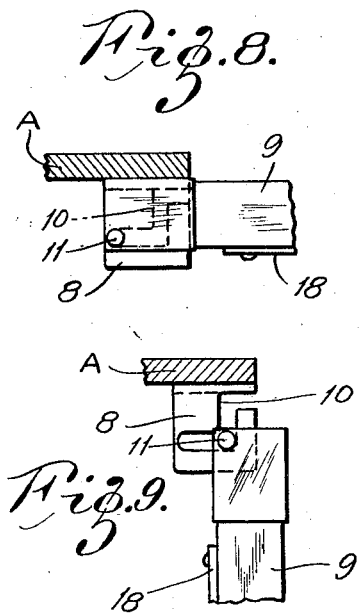
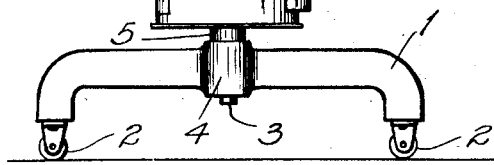
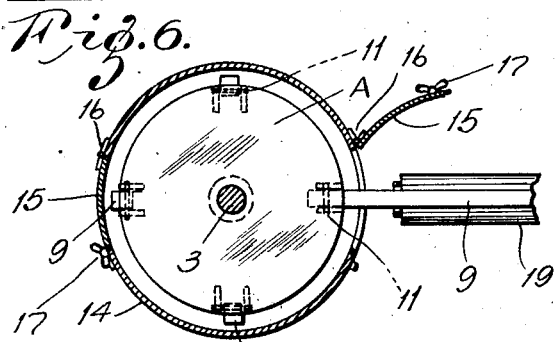
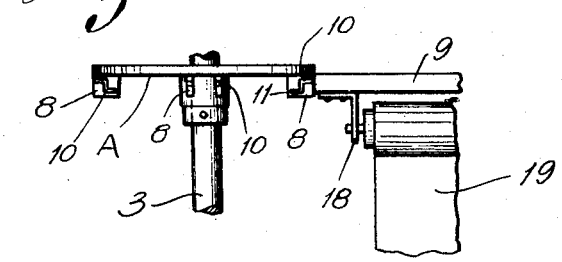
INVENTOR:
HERBERT E. KINCHELOE
By W. L. Dempsey,
ATTORNEY.

Patented Mar. 12, 1929.

1,705,190

UNITED STATES PATENT OFFICE.

HERBERT E. KINCHELOE, OF ST. LOUIS, MISSOURI.

COMBINED MAP CASE AND DISPLAY RACK.

Application filed November 28, 1927, Serial No. 236,261. Renewed December 21, 1928.

My invention relates to map cases and especially to that class of cases used in schoolrooms.

The object of my invention is to combine a map case and display rack in such a manner that two or more maps may be displayed at the same time.

Another object of my invention is to provide a map case that is readily transportable from one part of a room to another, or from one room to another.

Another object of my invention is to provide a map case that will hold a large number of maps in a very small space.

A further object of my invention is to provide a map case and display rack that will display two or more maps at the same time and from which any number of maps may be taken and handled for closer inspection.

Other and further objects and advantages of my invention will be apparent in the specification, claims and drawings, in which:

Fig. 1 is a front view of my improved map case, showing the door of the case.

Fig. 2 is a view of my improved map case with one map in display position.

Fig. 3 is a longitudinal transverse section showing the maps in a closed position.

Fig. 4 is a cross-section along the line 3—3 in Fig. 3.

Fig. 5 is a section along the line 5—5 in Fig. 3.

Fig. 6 is a section along the line 6—6 in Fig. 3.

Fig. 7 is a transverse section of the rotatable disc showing the hinge and support.

Fig. 8 is a detailed view of the map hinge, with map in a horizontal position.

Fig. 9 is a like view showing the map suspended in the case in a vertical position.

It has long been customary to mount maps and other data sheets on rollers so that they may be unrolled for examination and then rolled up when not in use so as to keep them protected from dust, dirt and moisture, and occupy a relatively small space. Where a very large number of maps or data sheets are frequently used, they are usually mounted in a single case, which is fastened to the wall or some particular place from which it is visible from every part of the room.

Maps so used must be drawn on such a large scale that they may be readily understood from any part of a room, and this necessitates an increased number of maps, owing to the large scale on which they are drawn, and frequently the combined size and weight of the case and maps makes it necessary to have them more or less permanently affixed to the wall. However, a great many contingencies arise when it is very desirable that a map be removed from one location to another for closer inspection. It is, also, frequently desirable that two or more maps be displayed at the same time, but the wall case map holders are so constructed that when one map is drawn down it hides the maps behind it, so that it would be necessary to have two sets of maps in order to display two at the same time. Again, the maps mounted in wall case holders are more or less permanently affixed to the case and fit into brackets in the case, and it is sometimes desirable and necessary that map be entirely withdrawn from the case for closer inspection.

To meet and overcome the above objections and contingencies I have devised a combined map case and display rack which being mounted on rollers may be readily transported from one place to another. It is, also, so constructed that two or more maps may be displayed at the same time; or one or more maps contained in the case may be instantly withdrawn with no other tool than the human hand. Also, the map is mounted in such a way that it can be operatively mounted on the wall, if so desired, by simply being suspended from a nail or any other suitable holder.

While my improved map case and display rack is primarily intended for use in schoolrooms it is, of course, equally convenient and valuable for use in lecturing and in a large class of manufacturing and commercial instances where data sheets are frequently referred to.

In Fig. 1 I have shown my preferred form of construction, which consists of a suitable base 1 mounted on rollers 2. Projecting vertically upward from the base 1 is a rotatable shaft 3 adapted to rotate in journalled bearings 4. The shaft 3 is supported in a definite vertical position by means of the collar 5 rigidly attached to the shaft 3. Two discs, a lower 6 and upper 7, are rigidly attached to the shaft 3 and rotate with it. A second upper disc 7ª is provided with a plurality of depending ears 8, of a special design later described, for the purpose of supporting map holding arms 9, either in a horizontal position, as shown in Fig. 2, or in a vertical position, as shown in Fig. 3.

The detail of the depending ears 8, which serve both as hinges and also as supports, is best shown in Figs. 8 and 9. The ears 8 are slotted, the slot 10 consisting of two horizontal portions joined by a vertical portion, a pin 11 being rigidly inserted transversely through the end of the arm 9. To insert the pin 11 in the slot 10, the arm 9 is held in a vertical position, passed into the upper transverse portion of the slot and then down through vertical portion of the slot. The arm is then raised to a horizontal position and pushed radially inward toward the shaft 3. The upper portion of the inner end of the arm 9 contacts with the under side of the upper disc 7a and is thereby supported in a horizontal position by the upper disc 7a and the pin 11 then in the lower portion of the slot. When the arm 9 depends in a vertical position, the bent flat spring 12 rigidly affixed to the lower end of the arm 9 resiliently engages a stop 13, thereby holding the arm with the attached map in a substantially vertical position when closed, thereby preventing the arm from coming in contact with the outer shell 4 of the casing when it is rotated.

The outer shell 14 of the case is provided with two diametrically oppositely disposed doors 15. It will be noted that doors are hinged to swing toward each other when opened, otherwise when the doors were opened and two maps displayed in a straight line, one of the doors would obscure a portion of a map. The doors 15 are provided with suitable hinges 16 and a fastener 17, and when closed the cylindrical case is entirely dust and moisture proof.

The upper and lower discs 6 and 7a, to which the maps are hingedly attached are rotatable with the shaft 3. The outer shell 14 is rotatable in either direction independent of the shaft 3, which is also rotated independent of the shell 14. This arrangement facilities the selection and display of the maps at any point within 360 deg.

The maps are suitably mounted upon the arms 9 by means of brackets 18 rigidly attached to the end or under side of the arm 9, the maps 19 being attached to ordinary spring-actuated window shade rollers.

At an equal distance from each end of the arm 9, on the upper side, loops 20 are provided adapted to be looped over a nail for exhibiting the map if removed from the case.

While I have shown a nut 21 to hold the case against longitudinal movement, it is obvious that any ornamental design could be used, including an extended light bracket for carrying electric light bulbs for throwing light directly on the maps when necessary.

In Fig. 2, I have shown a map displayed on one side of the case only, but as the doors are oppositely disposed, two maps may be shown at a time; and while I have shown only four maps in the case, it is to be understood that any number of maps may be disposed within the case.

Having fully described my invention, what I claim as new and useful and desire to protect by Letters Patent is:

1. A combined map case and display rack, of the class described, comprising a portable base, a vertically disposed rotatable shaft journalled in said base, a map rack attached to said shaft rotatable in a vertical plane, a dust-proof enclosure adapted to rotate about said map rack.

2. A combined map case and display rack of the class described, comprising a portable base, a rotatable shaft journalled in said base, a map rack attached to said shaft, means for hingedly supporting a plurality of arms to the upper end of said map rack, means for supporting said arms in a vertical position, means for holding said arms in a vertical position, means for supporting said arms in a horizontal position, means for rotatably mounting maps and charts upon said arms, means for attaching and detaching said arms from said map rack, and means for supporting said arms in a horizontal position upon a wall when detached from said rack.

3. A combined map case and display rack, comprising a portable base, a map holding rack rotatably mounted upon said base, a dust-proof rotatable case enclosing said map holding rack adapted to rotate about said map holding rack independent of the rotation of said map holding rack, oppositely and vertically disposed openings in said case, doors hingedly attached to said case adapted to close said openings in said casing, said doors opening toward each other and closing away from each other.

In witness whereof I have hereunto affixed my signature this 21st day of November, 1927.

HERBERT E. KINCHELOE.